Dec. 5, 1944.  D. BENSEL  2,364,049
PROCESS FOR PRESERVING FOOD AND PRODUCT
Filed April 7, 1941  2 Sheets-Sheet 1

INVENTOR
DURYEA BENSEL

BY  Ely & Frye

ATTORNEYS

Dec. 5, 1944.  D. BENSEL  2,364,049
PROCESS FOR PRESERVING FOOD AND PRODUCT
Filed April 7, 1941  2 Sheets-Sheet 2

INVENTOR
DURYEA BENSEL
BY
Ely & Frye
ATTORNEYS

Patented Dec. 5, 1944

2,364,049

UNITED STATES PATENT OFFICE 2,364,049

PROCESS FOR PRESERVING FOOD AND PRODUCT

Duryea Bensel, Los Angeles, Calif., assignor to Bensel-Brice Corporation, Los Angeles, Calif., a corporation of California Application April 7, 1941, Serial No. 387,191

9 Claims. (Cl. 99—193)

This invention relates to a process for preserving food, and more particularly, to a process for preserving food in a frozen condition.

The general process of preserving food by freezing has long been known to the art and has recently enjoyed considerable commercial success, particularly with respect to frozen vegetables and fruits. Such frozen foods have been rather limited in their distribution, however, due to several handicapping factors encountered in their production, distribution and storage prior to retail sale and the necessity for special handling after retail sale.

Heretofore, such foods have been frozen by subjecting them to excessively cooled brines to effect a so-called "quick freeze" either before or after the food has been packaged in the carton or container in which they were to be sold at retail. If the food was packaged prior to freezing, the carton, being of the usual lined cardboard construction, acted as an insulator, prolonging the time required to freeze the packaged food and often causing the growth of large ice crystals within the food. If the food were packaged after freezing, the food was frozen solid and was thus likely to be damaged during packaging.

In the distribution and storage of such frozen foods, it was necessary to maintain them at low temperatures at all times. If the temperature of the packaged food arose above approximately 20° F., the frozen moisture within the food would sublimate upon the surface, resulting in "frost burns" which caused the food to appear and taste as if it had been spoiled. Thus, special refrigerated trucks and refrigerators were necessary to handle the food prior to retail sale. After the retail sale, "frost burns" could be prevented only by thawing the food. After thawing the food spoiled rapidly and had to be cooked soon afterwards.

Thus, due to the special packaging and distribution cost, frozen food has been generally sold as fancy "out of season" food. Although superior in flavor, it was unable to compete in retail trade with canned goods because of the greater retail cost and poor keeping qualities after purchase.

It is an object of this invention to provide a process of packaging and freezing food which will enable food to be frozen in the package even more rapidly than when frozen in bulk heretofore. It is also an object of this invention to provide a method which will permit the use of cheap inexpensive packages. It is a further object of this invention to provide a process of packaging and freezing food which will permit the food to be stored in standard commercial display refrigerators, now generally employed for meats and dairy products, and in domestic refrigerators, thus eliminating the need for special low temperature refrigerators which have restricted the storage and distribution of frozen foods heretofore. A still further object of this invention is to provide a process of freezing and packaging food, such as vegetables and the like which will sterilize the food products so that the keeping properties of the food will be vastly improved and which will allow the food to be cooked with a greatly improved flavor.

Other objects and advantages of this invention will be apparent from the following specification, claims and drawings in which:

Figure 1:
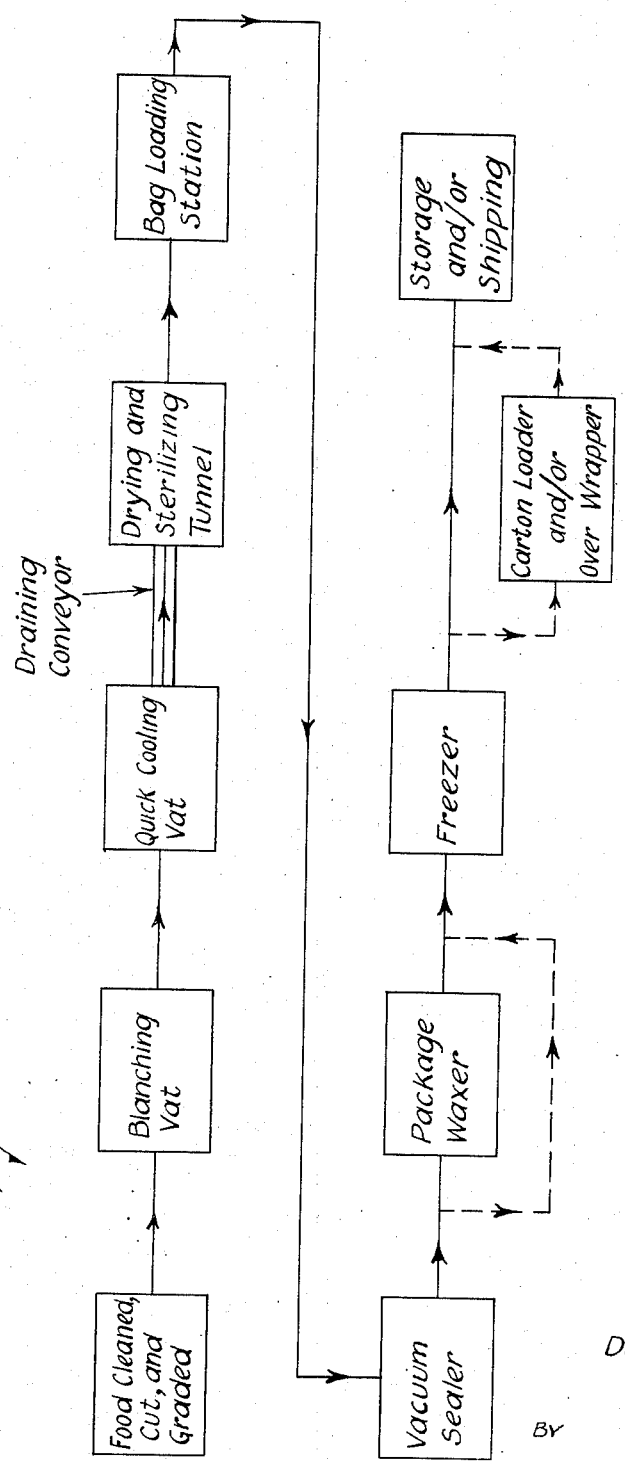
Fig. 1 is a diagrammatic flow sheet illustrating the several successive steps, in the preferred forms of this process.

This process is particularly adapted for the packaging and freezing of fresh vegetables, such as beans, peas, corn and the like. According to the preferred forms of this invention, as illustrated by the diagrammatic flow sheet in Fig. 1 of the drawings, the food to be packaged and frozen is first cleaned, cut to size, if necessary, and graded. The selected and graded vegetables are then carried to a blanching vat where they are immersed in water at a temperature of 180° F. to 190° F. for three to five minutes to shrink the product, set the color, and, in the case of corn, particularly, to fix the albumens. Mold and wild yeast spores which may be carried by the product are usually rendered at least inert by so blanching the products.

When blanched, the products are quickly cooled to approximately 70° F. in water at a temperature preferably between 40° F. and 50° F. Thus, the growth and incubation of thermophilic organisms which survive the blanching is effectively retarded.

From the quick cooling vat the products are taken to a drying and sterilizing tunnel by a draining conveyor, preferably comprising an agitated open mesh trough-shaped conveyor belt, which drains and shakes off a substantial portion of the cooling water clinging to the surface of the product.

Figure 2:
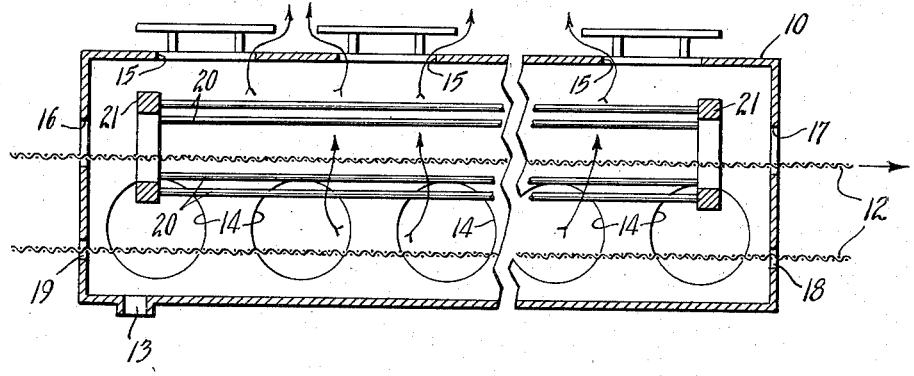
Fig. 2 is a longitudinal section through a drying and sterilizing tunnel employed in this process.

As illustrated in Fig. 2 of the drawings, the drying and sterilizing tunnel comprises a long tube or shell 10 which surrounds the open mesh conveyor 12. Throughout its length the tube 10 is provided with a plurality of inlet ports 14 and exhaust ports 15 by which drying air is forced through the tunnel, preferably transversely of the direction of travel of the open mesh conveyor 12, so that products carried by the conveyor will be thoroughly dried. The ends of the tube 10 are preferably closed except for the entrance 16 and the exit 17 for the conveyor 12. If the return run of the conveyor also passes through the tube 10, a restricted entrance 18 and exit 19 may be provided. If, perchance, any liquid water continues to drain off the products on the conveyor 12, it will be removed from the tube 10 through the drain 13.

The drying air supplied by the ports 14 is preferably at a temperature of not more than 90° F., since the purpose of drying the product is to completely remove surface moisture, in the form of dew, for example, and not to dehydrate the product. Thus, throughout the specification and claim, when the products are described as being "dried," it is to be understood that the products are simply free from surface moisture and are not dehydrated or desiccated. Since the amount of surface moisture to be removed will vary according to the size and quantities of the particular product being dried, the time the product remains in the tunnel and the amounts of drying air supplied (from any suitable source) by the ports 14 will have to be varied accordingly for each particular product.

Mounted within the tube 10 adjacent the ends thereof are the socket bus rings 21 which surround the conveyor 12. The bus rings 21 support a plurality of ultra-violet discharge tubes 20 which preferably surround the length of the conveyor 12 in the tube 10. The discharge tubes 20 are of the type now available on the market, of which substantially three-fourths of the radiant energy produced is invisible ultra-violet light having a wave length of approximately 2,500 Angstrom units. Due to the fact that ultra-violet light having wave lengths between 2,000 and 2,950 Angstrom units possess rapid bactericidal powers, thermophilic organisms, "flat-sour" organisms and similar bacteria on the food products will be killed so that the products will emerge from the tube 10 in a substantially sterile condition.

From the drying and sterilizing tunnel, the food products are quickly taken to a bag loading station where measured quantities of the food product are loaded into bags, preferably of flexible heat-sealable sheet material substantially impervious to air and moisture vapor. Examples of such flexible impervious material are rubber hydrohalide film, such as the film known commercially as "Pliofilm," polyvinyl resin films, such as the vinyl chloride films known commercially as "Vinylite" or "Koroseal," polyamide films, such as the film known commercially as "nylon," or films comprised of organic esters of cellulose or cellulose ethers. If such cellulosic sheets or films are not impervious, due primarily to their hygroscopic tendencies, they may be rendered impervious by a suitable bonded coating composition comprising a wax and/or a resin or by a coating composition having latex as a basic ingredient. Other suitable transparent, impervious materials may be impervious coated papers such as the coated paper product known commercially as "Diaphane" and comprising a paper, such as glassine, or, preferably, vegetable parchment, rendered impervious by a flexible, impregnating coating comprising a wax and/or a resin and a plasticizer.

Figure 3:
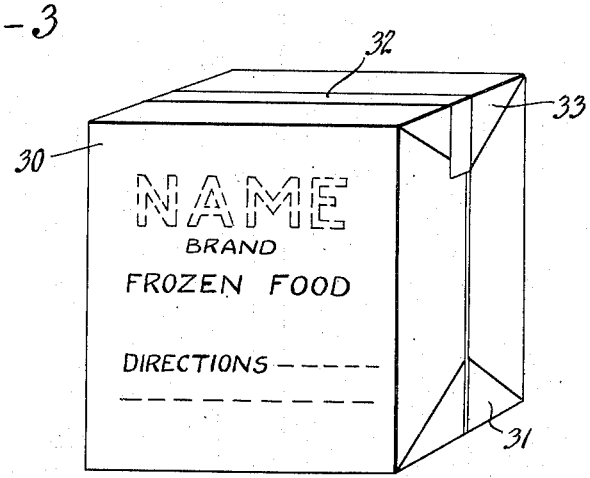
Fig. 3 is an isometric view of a package of food packaged and frozen by this process.

As shown in Fig. 3 of the drawings, the bags of flexible impervious sheeting may comprise a flat printed bag 30 squared up on a suitable former so that it is rectangular in section, the triangular bottom corners 31 being folded up against the side panels of the bag. When the bag is squared up, it is placed in a rigid female form and the male former is withdrawn. The bag is then filled with a measured quantity of food and taken to the vacuum sealer where a vacuum of preferably 29.10 inches is drawn on the contents of the bag prior to and at the instant of sealing. Having at least an inner surface of thermoplastic material, the bag is sealed by subjecting the distended mouth of the bag to heat and pressure to form the heat-seal 32. Due to the atmospheric pressure on the contents of the bag, the bag 30 retains its prismatic form when it is withdrawn from the female form. The triangular top corners 33 are then folded down against the side panels of the bag 30 to form the neat prismatic package shown in Fig. 3.

The filled and vacuum sealed packages are then passed through a dipping tank where a thin coating of wax, such as paraffin maintained at 125° F., for example, is applied to the outer surface of the package. Although this outer wax coating may serve to additionally seal the package, this function is not important, since the primary function of the wax coating is to prevent adjacent packages from becoming frozen together by atmospheric moisture during the subsequent freezing and storing of the packages.

Following the waxing operation, the packages are carried to a feezer where the packages are subjected to rapid freezing at a temperature of −10° F. or lower. It has been discovered that food products prepared and vacuum sealed as described above freeze far more rapidly than foods packaged in ordinary lined paper cartons and even more rapidly than if the food is frozen in bulk. Thus, food prepared and vacuum packed by my method will obtain a quicker freeze if subjected to the same "quick freezing" temperatures employed heretofore and will obtain an equal quick freeze at appreciably higher temperatures. I cannot completely explain why such superior and more economical results are obtained. Although the effect of the vacuum within the package would apparently be to impede and reduce the rate of heat transfer from the contents of the package, it is thought that perhaps the absence of moisture films on the particles of food, plus the fact that the food particles are compressed together by the atmospheric pressure on the package, may increase the rate of heat transfer by conduction. Obviously, other and better explanations of this phenomenon may be proposed as the study and theory of heat transfer advances.

Since the rigidity of the vacuum sealed package is increased somewhat by freezing, the frozen packages may be packed for shipment and storage immediately after they are removed from the freezer, the expensive printed cardboard individual cartons being unnecessary. However, some packers may wish to use such outer individual cartons for the sake of appearances to avoid possible consumer reaction to the seemingly fragile appearance of the thin and preferably transparent printed bag 30. In such instances the waxing of the packages may be omitted and slip sheets of waxed or other non-adherent paper may be inserted between adjacent packages during freezing to prevent the packages from being frozen together; then, prior to packing in large cartons for shippnig and storage, the individual packages may be loaded into individual cardboard cartons; such cardboard cartons may be overwrapped with "Cellophane" if desired.

Another phenomenon discovered is that packages vacuum sealed according to this invention may be shipped and stored at temperatures as high as 30° F. without producing "frost burns." The reason for this result cannot be fully explained, although it is believed that because the food is packed dry and in a vacuum, the only moisture in the package is that within the food product and that sublimation of such moisture will not occur in the high vacuum of the package. The advantage of this phenomenon is that the frozen food may be shipped in standard refrigerated cars and trucks and displayed in retail stores in standard display refrigerators. Thus, the need for expensive special low temperature refrigerators, which restricted the handling and distribution of frozen foods heretofore, is eliminated. Also, the packages may be stored for any length of time in domestic mechanical refrigerators which normally do not have compartments refrigerated to the 20° F. necessary heretofore. Furthermore, if the packages are allowed to thaw after purchase, they will not tend to spoil rapidly since the contents are sterilized.

Another advantage of this invention is that it is not necessary to thaw or remove the vacuum sealed bag 30 prior to cooking. The bag 30, with its contents still frozen, may be placed in water and then heated, the contents being removed after they have been cooked. The foods are thus cooked in their own juices, none of which are lost by evaporation or dilution. The flavor of foods frozen by my method is perceptibly superior to foods frozen by the methods employed heretofore.

This invention, obviously, is not restricted to the preferred embodiments disclosed, but may be modified to meet the needs of specific situations and products for which it may be adapted. This invention, therefore, is only restricted in scope to that of the following claims.

What is claimed is:

1. The process of preserving vegetable food by freezing comprising the steps of drying the food until free surface moisture is removed, sealing the dried food in a vacuum within a sealed container, freezing the sealed package of food, and thereafter maintaining the frozen package of food at a temperature of less than 32° F. until it is to be prepared for consumption.

2. The process of preserving vegetable food comprising the steps of drying and sterilizing the food until free surface moisture is removed, sealing the food in a vacuum within a container of flexible impervious material, freezing the sealed package of food, and thereafter maintaining the frozen package of food at a temperature less than 32° F. until it is to be prepared for consumption.

3. The process of preserving vegetable food comprising the steps of blanching the food, quickly cooling the blanched food, passing a current of dry air over the food until substantially all liquid surface moisture is removed therefrom, sterilizing the food with ultra-violet bactericidal radiations, placing the food in a flexible impervious container of heat-sealable sheet material, drawing a vacuum on said container, and hermetically heat-sealing said container on which the vacuum has been drawn, and then freezing said sealed package of food.

4. The process of preserving vegetables according to the process defined in claim 3 in which said food is blanched, to shrink the food and set its color, for three to five minutes in water ranging between 175° F. and 200° F.

5. The process of preserving vegetables, according to the process defined in claim 3, in which said food is blanched, to shrink the food and set its color, for three to five minutes in water ranging between 175° F. and 200° F. and is quickly cooled to substantially 70° F.

6. The process of preserving food according to the process defined in claim 3, in which the sealed packages of food are coated with a thin coating of wax prior to freezing.

7. The process of preserving food according to the process defined in claim 3 in which non-adherent material is placed between adjacent packages of food during freezing.

8. The process of preserving food according to the process defined in claim 3, in which sheets of non-adherent paper are placed between adjacent packages of food during freezing, removing said sheets after freezing, and then placing said packages in protected cardboard cartons.

9. A package of vegetable food preserved according to the method defined in claim 3, said package comprising a hermetically sealed container of flexible impervious heat-sealable sheet material and a dry body of frozen food under a high vacuum with said sealed container, the atmospheric pressure on the exterior of said container and the frozen condition of the body of food within said container maintaining said package in a strong rigid condition.

DURYEA BENSEL.